United States Patent [19]

Kojima et al.

[11] Patent Number: 4,852,736

[45] Date of Patent: Aug. 1, 1989

[54] METAL CASE FOR HOUSING AN IC AND A MANUFACTURING METHOD THEREFOR

[75] Inventors: Masayasu Kojima; Chihiro Hayashi, both of Takarazuka, Japan

[73] Assignee: Sumitomo Metal Industries, Osaka, Japan

[21] Appl. No.: 257,866

[22] Filed: Oct. 14, 1988

[30] Foreign Application Priority Data

Oct. 16, 1987 [JP] Japan .................................. 62-261237
Oct. 26, 1987 [JP] Japan .................................. 62-269867
Jul. 13, 1988 [JP] Japan .................................. 63-174598
Sep. 14, 1988 [JP] Japan .................................. 63-230509

[51] Int. Cl.⁴ .............................................. B65D 73/02
[52] U.S. Cl. ................................... 206/328; 206/329; 220/75; 29/830; 29/592.1
[58] Field of Search .................. 220/75; 206/328, 329; 29/592.1, 829, 830

[56] References Cited

U.S. PATENT DOCUMENTS 3,349,481 10/1967 Karp ............................... 206/329 X
4,615,441 10/1986 Nakamura ........................... 206/329
4,758,689 7/1988 Nakao et al. ..................... 206/329 X Primary Examiner—William Price
Attorney, Agent, or Firm—Burns, Doane, Swecker & Mathis

[57] ABSTRACT

A metal case for housing electronic parts including an IC and a manufacturing method therefor are disclosed. The case comprises a shallow vessel having a wall on its periphery which is formed from metal sheet having the same thickness as the bottom of said depression and a rectangular metal ring which has a contour such that it can fit into the wall of said shallow vessel, said rectangular metal ring being fit into said shallow vessel and connected thereto so as to form a single body.

17 Claims, 15 Drawing Sheets

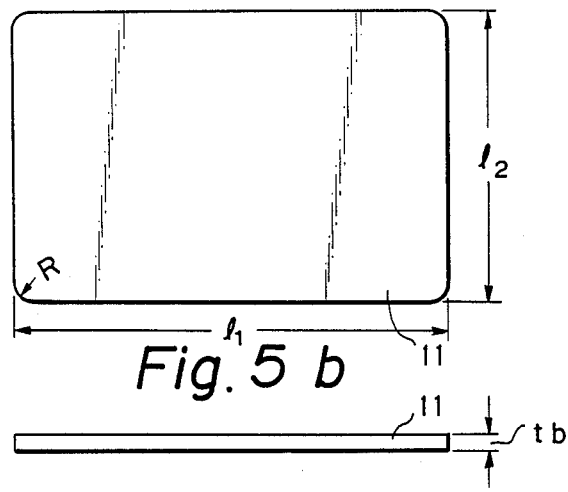
Fig. 5a
Fig. 5b
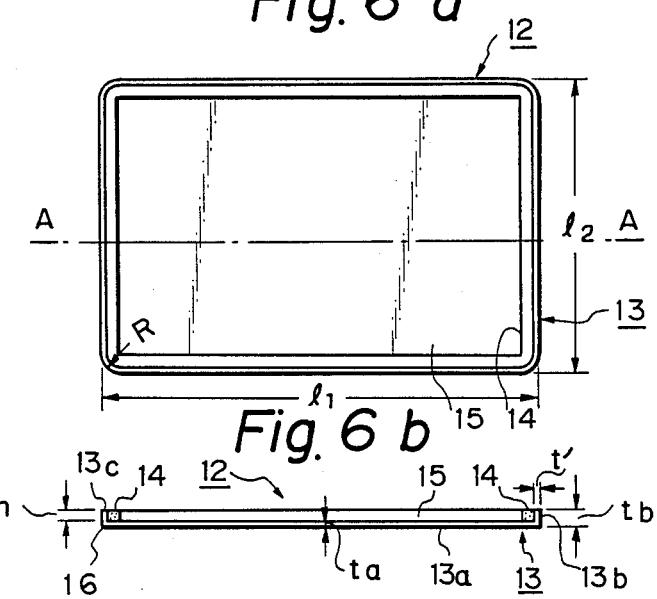
Fig. 6a
Fig. 6b

METAL CASE FOR HOUSING AN IC AND A MANUFACTURING METHOD THEREFOR

BACKGROUND OF THE INVENTION

This invention relates to a metal case for housing an IC and a manufacturing method therefor, and more particularly, it relates to a thin metal case for housing electronic parts which include IC's and a manufacturing method. Such a metal case can be used for thin products, typical examples of which are card-shaped electronic products such as IC cards and card-type electronic calculators. In the present specification, an explanation will be given with respect to IC cards as a typical example, but the present invention can of course be used for housing any thin, plate-shaped electronic products which contain IC's or other electronic parts.

At the present time in the so-called "card age", as computers develop and become more wide-spread, the use of IC cards which contain integrated circuits which serve as data storage devices and data processing devices is being investigated as a replacement for conventional magnetic cards having magnetic tape bonded thereto. IC cards have a far greater data storage capacity than magnetic cards, and research and development is being carried out concerning their application in various fields, such as in banking where IC cards could be used instead of bankbooks, or in health care where they could be used instead of clinical charts for patients.

As a rule, it is necessary for an IC card to have the same thickness (about 0.7 mm) as conventional magnetic cards, but with an IC card in the form of a plate-shaped plastic base which houses an IC chip, bending produces severed wires where the IC chip is bonded, and there is the possibility of data loss or of the IC card being rendered malfunctional.

The use of an IC card in which the IC chip and other electronic parts are housed in a metal case and the bending stiffness is increased is being studied. Such an IC card has excellent durability when subjected to rubbing or when it becomes dirty. Furthermore, if a material such as stainless steel or titanium is used for the metal case, there is no worry of rusting occurring.

FIG. 1 illustrates two examples of conventional packages for IC cards of this type. FIG. 1a is a cross-sectional view of a package which is formed from a plastic base 1, which supports an IC and other electronic parts, and two metal sheets 2 which are laminated to both sides of the base 1. IG. 1b is a cross-sectional view of an example in which two metal cases 3 which are formed from metal sheets into shallow vessels are bonded to and cover a plastic base 1. In FIG. 1b, on account of the walls 3' of the metal cases 3, the IC card has greater stiffness than the IC card of FIG. 1a. Alternatively, when the two cases have the same stiffness, the thickness of the metal cases 3 is less than that of the metal sheets 2 of FIG. 1a.

As the periphery of the plastic base 1 is also covered by metal sheet, the IC card has excellent durability and reliability, and moreover it is protected against static electricity. An IC card having a metal package of the type shown in FIG. 1b is described in Japanese Published Unexamined Patent Application No. 61-258798.

With a conventional IC card, when attempting to learn what information is stored inside it, it is necessary to go to a bank or other place having a card reader, and therefore it is not possible for the user of the card to easily read the stored information.

Recently, however, displays for displaying the stored information and keyboards for inputting information have been built into IC cards, and research is being performed on IC cards of this type having the same thickness as conventional cards. IC cards of this type contain a larger number of devices than conventional cards and therefore require high rigidity. For such cards, the metal case structure illustrated in FIG. 1b is inadequate.

The stiffness of the metal cases 3 of an IC card having the structure shown in FIG. 1b can be increased without increasing the total thickness by making the walls 3' sturdier. In this case, as shown in FIG. 2, a metal case 4 which has a thickness T and which can house the entirety of a plastic base 1 is employed, and it is covered by a cover 5 made from a metal sheet. It is necessary to make the thickness b of the walls 4' of the metal case 4 sufficiently large.

FIG. 3 shows one example of an IC card using a metal case. FIG. 3a is a plan view, and FIG. 3b is a cross-sectional view. The lengths $l_1$ and $l_2$ are the same as for a conventional magnetic card made of plastic. According to international specifications, $l_1 = 85.60$ mm and $l_2 = 54.00$ mm. The corner radius $R = 3.0$ mm, for example. The total thickness T is the same as for a conventional magnetic card, and is 0.76 mm according to international specifications.

An IC chip and other electronic parts are housed inside a space 6 formed by a vessel-shaped metal case 4 and a metal cover 5. The plate-shaped metal lid 5 is connected to the metal case 4 and they together constitute a finished product 7 such as an IC card. The inner space 6 is closed. The metal cover 5 is equipped with a display 8 for the stored information and keys 9 such as a power switch and input buttons. The thickness $t_c$ of the metal cover 5 is about 50 μm. The IC chip and other electronic parts which are housed within the space are prevented from breaking due to bending largely by the metal case 4.

FIG. 4 shows a conventional metal case 4. FIG. 4a is a plan view, and FIG. 4b is a cross-sectional view. As stated previously, the metal case 4 is in the shape of a vessel and has a depression 10 which houses an IC chip and other electronic parts. A rim 4b having the shape of a picture frame is provided around the depression 10. Its widths are $b_1 = 2$ mm and $b_2 = 3$ mm, for example. The lengths $l_1$, $l_2$ and the radius R are the same as in FIG. 3.

The thickness $t_b$ of the rim 4b is 0.6.–0.7 mm, while the thickness $t_a$ of the bottom 4a need only be about 0.1 mm. Namely, in spite of having an extremely thin bottom, the metal case 4 has a depression 10 with a large area.

SUMMARY OF THE INVENTION

As described above, various types of metal cases for IC cards have already been proposed. The required properties of such cases for IC cards are as follows.

(1) It must be possible to manufacture a case cheaply and in large quantities.

(2) The case must have a certain rigidity.

(3) The case must be able to protect data, i.e., provide security.

(4) The case must be light.

(5) The case must have excellent corrosion resistance.

(6) The case must be able to provide adequate protection against magnetism.

However, with the conventional metal case 4 which is illustrated in FIG. 4, as there is a large difference between the thickness $t_a$ of the bottom 4a and the thickness $t_b$ of the rim 4b, its manufacture is difficult. Methods which have been thus far proposed for forming a depression 10 for making an inner space 6 inside a metal case 4 can be divided into machining, etching, and forging methods.

A plate-shaped blank 11 like that shown in FIGS. 5a and 5b having a thickness $t_b$ is first prepared by blanking or the like so as to have a prescribed shape.

When the depression 10 is formed by machining, as the bottom 4a is thin, it easily deforms due to the force and heat of machining. In order to prevent such deformation, it is necessary that the cutting depth for each cut be extremely shallow. Therefore, the working efficiency is extremely poor and low productivity is unavoidable.

With etching, it is necessary to mask those portions which are not to be etched, and the masking operation is time-consuming. Furthermore, when the metal case is made from stainless steel in order to give it corrosion resistance, the etching efficiency is poor and etching requires much time. Furthermore, it is difficult to finish the bottom 4a to a uniform thickness.

With forging, as the outer dimensions of the bottom 4a are much larger than its thickness, a very large working force is needed, and therefore forging is difficult to perform.

In addition, there is a need for the inexpensive mass production of metal cases for IC cards like those described above having a prescribed performance.

Accordingly, the general object of this invention is to provide a metal case and a method for manufacturing the metal case for housing an IC which solves the above-described problems of the prior art.

Another object of the present invention is to provide an inexpensive manufacturing method for a metal case for an IC card which has as simple a structure as possible and which is sufficiently stiff and sturdy.

A still another object of the present invention is to provide an efficient manufacturing method for a metal case for an IC card in which a two-piece structure comprising a shallow vessel and a rectangular ring are formed into substantially a single body.

In one aspect, the present invention is a metal case for housing electronic parts including an IC of the type having a depression and rim which surrounds the depression and has the shape of a picture frame, characterized by comprising a shallow vessel having a wall on its periphery which is formed from metal sheet having the same thickness as the base of the depression and a rectangular metal ring which has a contour such that it can fit into the wall of the shallow vessel, the rectangular metal ring being preferably no thicker than the depth of the depression, being fit into the shallow vessel, and being connected thereto so as to form a single body.

In another aspect, the present invention is a manufacturing method for a metal case for housing an IC, the case having a depression for housing an electronic part which includes an IC and having a peripheral rim in the shape of a picture frame which surrounds the depression, characterized by press forming a shallow vessel having peripheral wall, preferably, having a height substantially equal to the depth of the depression from a metal sheet having a thickness equal to the thickness of the bottom of the depression, forming a rectangular ring which is made from a metal sheet and which has an outer peripheral shape such that it can fit into the inner wall of the shallow vessel and which has roughly the same inner peripheral shape as the outer peripheral shape of the depression, and then fitting said rectangular ring against the inner surface of the side wall of said shallow vessel so as to form a fit-together item, and connecting the shallow vessel and the rectangular ring which constitute the fit-together item to form a single body.

In a preferred mode of the present invention, the rectangular ring is formed by punching from a metal sheet preferably having a thickness roughly equal to the depth of the depression. From the standpoint of manufacturing efficiency, punching is desirable, but manufacture may also be performed by laser cutting. In some cases, the members which constitute each side can be assembled by welding.

Furthermore, the shallow vessel and the rectangular ring which constitute the fit-together item are connected by welding, bonding, or brazing. Of course, a combination of welding and bonding, or welding and brazing may be used.

Such a metal case for housing an IC is used for housing a thin product utilizing IC's, a typical example of which is a card-type electronic product, and some examples of products for which the present invention can be applied are IC cards and card-type electronic calculators. In the present specification, an explanation will be given with respect to IC cards as a typical example, but the present invention can of course be applied to other thin, plate-shaped electronic products which contain IC chips and other electronic parts.

BRIEF DESCRIPTION OF THE DRAWINGS

FIGS. 5a and 5b are respectively a plan view and a cross-sectional view of a plate-shaped blank;

FIGS. 6a and 6b are respectively a plan view and a cross-sectional view of a metal case in accordance with the present invention;

DESCRIPTION OF THE PREFERRED EMBODIMENTS

Next, a metal case for housing an IC in accordance with the present invention will be explained in greater detail while referring to the accompanying drawings.

As shown in FIGS. 6a and 6b, a metal case 12 in accordance with the present invention has a two-piece structure and comprises a shallow vessel 13 made of metal and a rectangular metal ring 14. The rectangular metal ring 14 fits inside the shallow vessel 13. A method of connecting the shallow vessel 13 and the rectangular metal ring 14 will be described further on.

Figure 1:
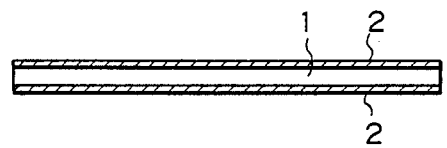
FIGS. 1a and 1b are schematic cross-sectional views of conventional metal cases.
Figure 1:
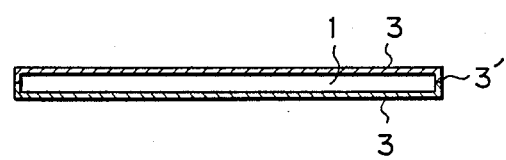
Figure 2:
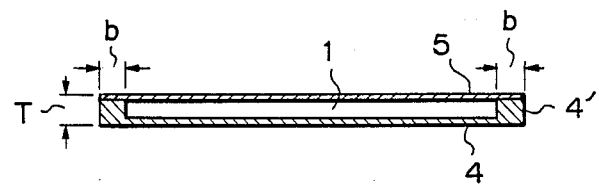
FIG. 2 is a schematic cross-sectional view of a variation of the same.
Figure 3A:
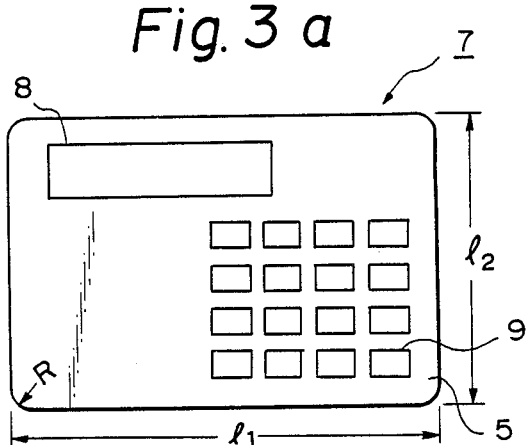
FIGS. 3a and 3b are respectively a plan view and a cross-sectional view of an IC card using a metal case.
Figure 3B:
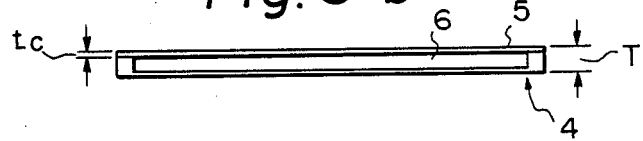
Figure 4A:
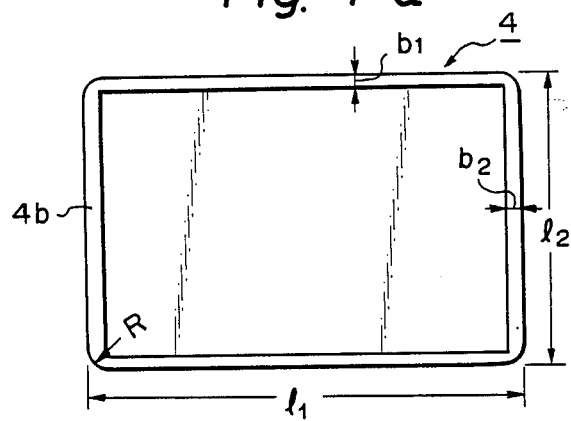
FIGS. 4a and 4b are respectively a plan view and a cross-sectional view of a conventional metal case.
Figure 4B:
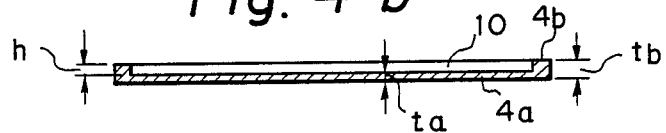

There are no particular restrictions on the dimensions in accordance with the present invention, but the outer dimensions $l_1$ and $l_2$, the corner radius R, the bottom thickness $t_a$, and the overall thickness $t_b$ can be the same as for the conventional example shown in FIG. 4. Furthermore, the depression 15 which is formed by the shallow vessel 13 and the rectangular metal ring 14 (hereinafter referred to simply as a "rectangular ring") can have the same dimensions as the depression 10 of the conventional metal case 4 of FIG. 4.

Figure 21:
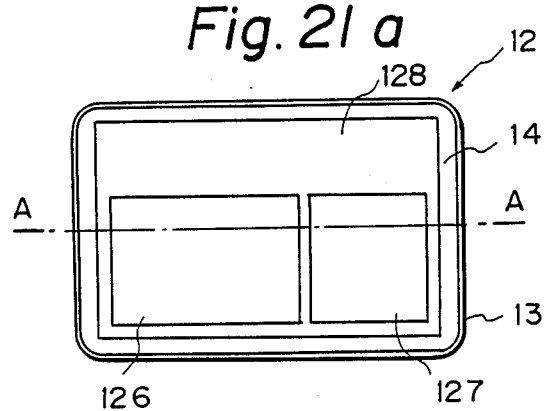
FIGS. 21a and 21b are respectively a plan view and a cross-sectional view of different types of metal cases in accordance with the present invention.
Figure 21:
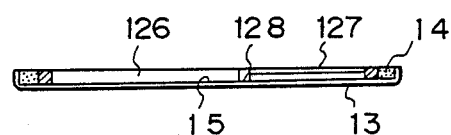

Of course, depending on the product, the part which is to be housed may be small, and the entirety of the depression 15 may not be necessary. In this case, as shown in FIGS. 21a and 21b, a plastic plate 128 having a through hole 126 or a depression 127 formed therein can be fit into the depression 15 of the metal case 12.

Figure 22:
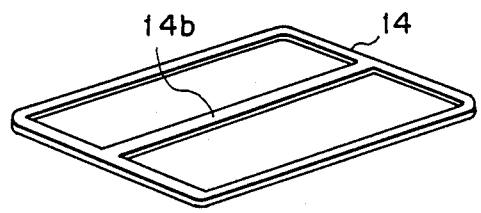
FIGS. 22a and 22b are schematic perspective views of other examples of rectangular rings.
Figure 22:
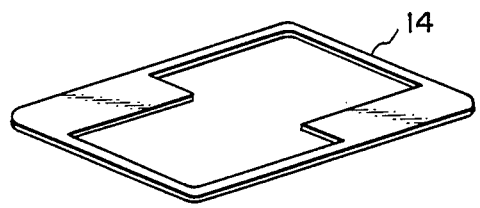

In FIG. 6, the rectangular ring 14 has the shape of a picture frame so as to make the area of the depression 15 as large as possible. However, one having a cross piece 14b as shown in FIG. 22a or one whose width is varied in portions as shown in FIG. 22b is also conceivable. Rectangular rings of this sort are also included within the scope of the present invention.

The metal case 12 of the present invention which is shown in FIG. 6 is formed from a shallow vessel 13 whose bottom and sides are integral with one another, and the entire outer periphery of the rectangular ring 14 is restrained by the side walls 13b of the vessel. Therefore, after the two are connected to one another, it is difficult for the rectangular ring 14 and the shallow vessel 13 to separate, and it is difficult to deliberately break the connecting portion. In addition, an adhesive or brazing metal will not ooze out from the connection. Furthermore, as the side walls 13b of the vessel are formed by bending in a manner to be described further on, the corners 16 of the bottom 13a have a natural roundness, and there is no danger in handling them.

Figure 7:
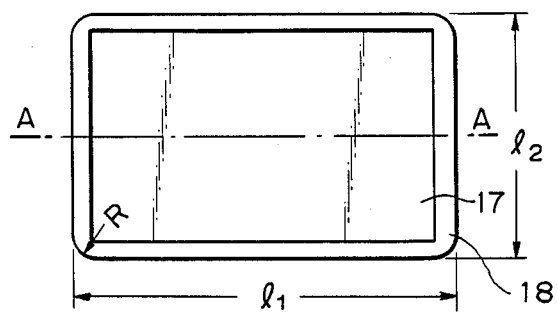
FIGS. 7a and 7b are respectively a plan view and a cross-sectional view of a comparative example of a metal case.
Figure 7:
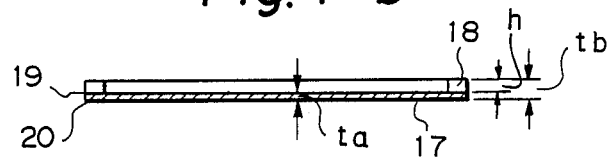

As shown in FIG. 7, a variation of the conventional metal case 4 shown in FIG. 4 is also conceivable by employing a flat plate 17 and a rectangular ring 18. In this case, the outer dimensions $l_1$ and $l_2$ and the corner radius R of the rectangular ring 18 are the same as those of the metal case 4, and the thickness "h" is the same as the depth of the depression 10 of the metal case 4. The thickness $t_a$ of the flat plate 17 is the same as the thickness $t_a$ of the bottom 4a of the metal case 4. The outer dimensions of the flat plate 17 are the same or slightly smaller than those of the rectangular ring 18. The flat plate 17 and the rectangular ring 18 can conceivably be connected together by bonding, by brazing, or by welding of the connecting portions 19 on the outer periphery. However, as the connecting portions 19 are exposed, outward oozing of adhesive material or brazing metal can not be prevented. Furthermore, if a section of the connection, i.e., of the bonded or brazed portion should peel off, there would be the danger of moisture, dust, and the like impairing the function of the IC and other electronic parts which are housed within the case. In addition, there is the danger of the connection being deliberately broken. Even with welding, there is the possibility of local peeling or breakage, and there is the problem that the weld bead mars the outer appearance. Furthermore, whatever welding method is used, with a metal case having the shape shown in FIG. 7, the corners 20 of the bottom inevitably become sharp and dangerous to use, so it is necessary to perform chamfering of the corners, which necessarily increases manufacturing costs.

Next, a manufacturing method for the shallow vessel 13 and the rectangular ring 14 of the metal case 12 of the present invention shown in FIG. 6 will be explained.

Figure 8:
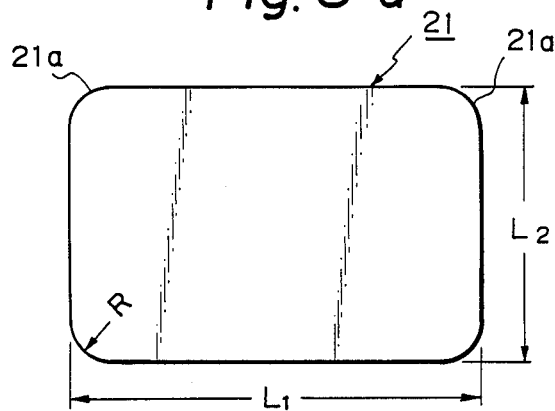
FIGS. 8a and 8b are respectively a plan view and a cross-sectional view of a blank.
Figure 8:
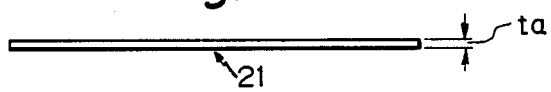

FIGS. 8a and 8b are respectively a plan view and a sectional view of a blank 21 for the shallow vessel 13. It is a metal sheet having the same thickness as the bottom thickness $t_a$ of the shallow vessel 13. The outer dimensions $L_1$ and $L_2$ and the curvature "R" of the corners 21a are chosed so that the height of the side walls 13b will be uniform for the entire periphery after the below-described bending of the edges is performed.

Figure 20:
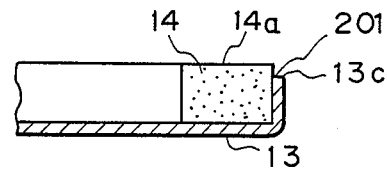
FIGS. 20a and 20b are respectively a plan view and a cross-sectional view of another example of a metal case.
Figure 20:
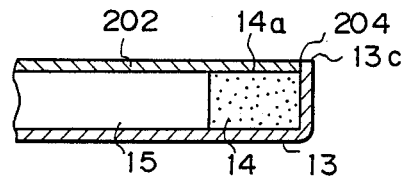

The height of the side walls 13b need not be such that they are even with the top surface 14a of the rectangular ring 14 as shown in FIG. 6b, and as shown in FIG. 20a, the top surface 13c of the side walls may be slightly lower than the top surface 14a of the rectangular ring. In particular, this method is suitable when the rectangular ring 14 and the shallow vessel 13 are connected by forming a weld bead on the step portion 201.

Conversely, as shown in FIG. 20b, it is possible to make the top surface 13c of the side walls slightly higher than the top surface 14a of the rectangular ring, to fit a cover 202 inside the shallow vessel after an IC or other electronic parts (not shown) is housed in the depression 15, and then to weld the shallow vessel 13 to the cover 202 along the joint 204 therebetween.

Figure 9:
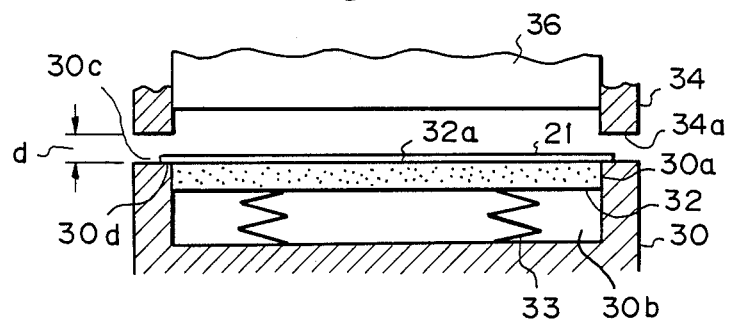
FIGS. 9a, 9b, and 9c are schematic views for explaining the working process on a blank in a manufacturing method for a metal case in accordance with the present invention.
Figure 9:
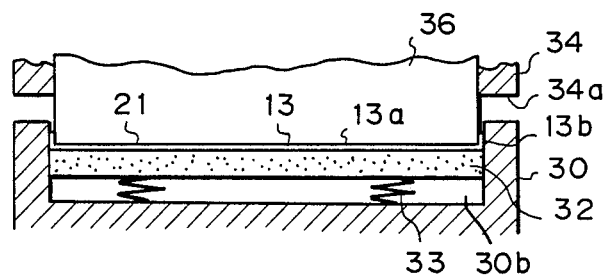
Figure 9:
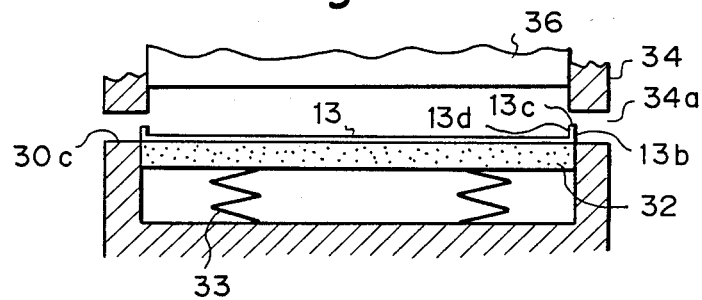

FIGS. 9a, 9b, and 9c show a bending process which is performed with a press.

FIG. 9a shows the state in which a blank 21 is set in a die 30. The shape of the die hole 30a when viewed in plan is the same as the contour of the side walls 13b of the vessel shown in FIGS. 6a, 6b, or slightly smaller than the contour of the side walls. A knockout plate 32 which is elastically supported by a spring 33 is disposed in the die hole 30b. Its top surface 32a is level with the top surface 30c of the die. A stationary stripper 34 is disposed above the die 30 with a separation "d" therebetween which is somewhat larger than the height $t_b$ of the side walls 13b of the vessel shown in FIGS. 6a and 6b. A punch 36 is lowered along its inside. The shape of the punch 36 when viewed in plan is the same as that of the die hole 30a with allowance made for the thickness $t'$ of the side walls 13b of the vessel (see FIG. 6b).

FIG. 9b shows the state in which the punch 36 is lowered by an unillustrated pressing apparatus, and the blank 21 is pressed in along the shoulder 34a of the die. As a result, a shallow vessel 13 having a side wall 13b on its periphery as shown in FIG. 6b is formed. The bottom 13a of the vessel is pressed and supported by the knockout plate 32 and remains flat.

Next, when the punch 36 is raised, the shallow vessel 13 is raised to the height of the top surface 30c of the die by the knockout plate 32, and the situation is as shown in FIG. 9c. When the shallow vessel 13 adheres to the punch 36 and rises therewith, the top surface 13c of the side walls of the vessel contacts the die shoulder 34a which corresponds to the lower surface of the stationary stripper 34. If the punch 36 is raised further, the shallow vessel 13 separates from the punch 36 and falls onto the knockout plate 32. The vessel 13 is removed from the mold, and the edge bending is completed.

Figure 10:
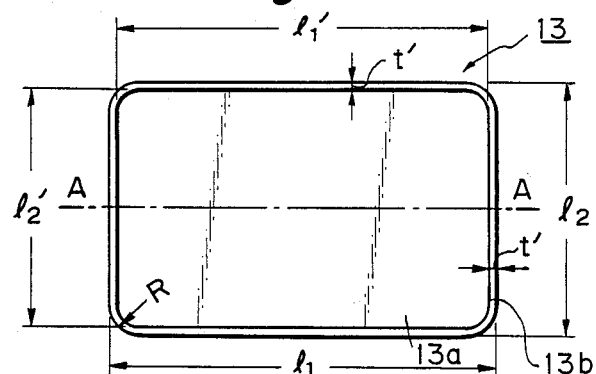
FIGS. 10a and 10b are respectively a plan view and a cross-sectional view of a shallow vessel.
Figure 10:
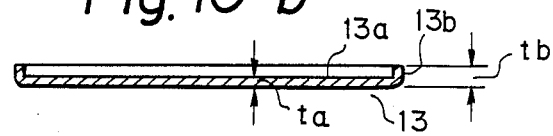

FIGS. 10a and 10b show a molded product like that shown in FIG. 9c. The thickness $t'$ of the side walls 13b of the shallow vessel is the same as the thickness $t_a$ of the blank 21 or else can be finished so as to be smaller than $t_a$ by adjusting the clearance between the punch 36 and the die hole 30a.

Next, a manufacturing method for the rectangular ring 14 will be described. An explanation will be made with respect to the ring having the shape of a picture frame which is shown in FIG. 6, but the explanation also applies to the rings having the shapes shown in FIGS. 21 and 22.

FIGS. 11a and 11b are respectively a plan view and a cross-sectional view of a rectangular ring 14 which is preferably manufactured from a metal sheet of thickness $t_c$ by blanking or laser cutting. The manufacturing efficiency of blanking is excellent, and it is particularly suitable for mass production. On the other hand, laser cutting has the advantage that if a program controlled machine is used, any shape can be cut without the use of a mold.

The thickness $t_c$ of the ring is determined considering the depth "h" of the depression 15 shown in FIG. 6.

The outer dimensions of the rectangular ring 14 shown in FIG. 11a are the same as the inner dimensions of the side walls 13b of the shallow vessel 13 or else are slightly larger. This is so that when the shallow vessel 13 is assembled, there will be a transition fit or an interference fit. The reason for this will be explained further on. The widths $b_1'$ and $b_2'$ of each side of the rectangular ring 14 are chosen so that when it is assembled as shown in FIG. 6, the inner dimensions of the depression 15 of the metal case 12 will be the same as the inner dimensions of the depression 10 of the one-piece metal case 4 shown in FIG. 4. As an example of the dimensions of the rectangular ring 14, if the dimensions of the metal case 12 of FIG. 6 and $l_1 = 85.60$ mm, $l_2 = 54.00$ mm, $R = 3.0$ m, and $t' = 0.1$ mm, then $l_1' = 85.42$ mm, $l_2' = 53.82$ mm, $R' = 2.9$ mm, $b_1' = 1.9$ mm, and $b_2' = 2.9$ mm.

Figure 11:
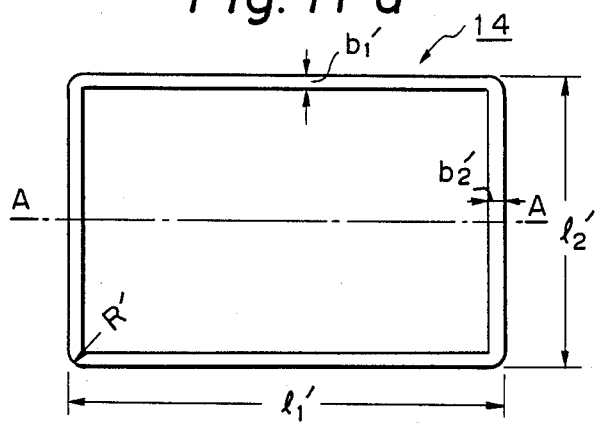
FIGS. 11a and 11b are respectively a plan view and a side view of a rectangular ring which is used in the present invention.
Figure 11:
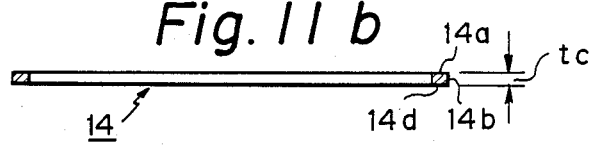

The rectangular ring 14 of FIG. 11 can be manufactured as a single body, but as is clear from the preceding example of dimensions, the central hole is large, so in this case the material yield is poor.

Figure 12:
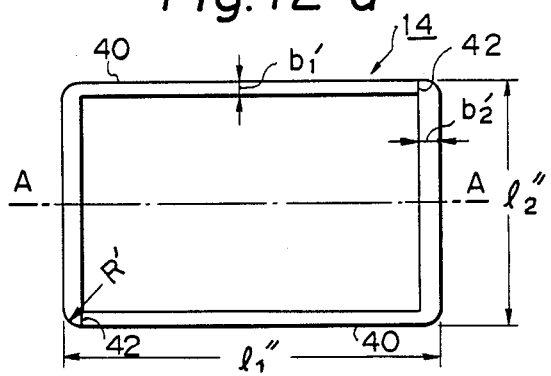
FIGS. 12a and 12b are respectively a plan view and a cross-sectional view of another rectangular metal ring.
Figure 12:
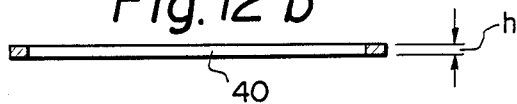

The widths $b_1'$ and $b_2'$ of the sides of the rectangular ring 14 are determined by the inside dimensions of the depression 15 of the metal case 12 shown in FIG. 6. Instead of being formed in the manner shown in FIG. 11, the rectangular ring 14 can be formed by combining two L-shaped frames 40 as shown in FIGS. 12a and 12b and welding the connecting portions 42 together. In this case, the yield is increased.

Figure 13:
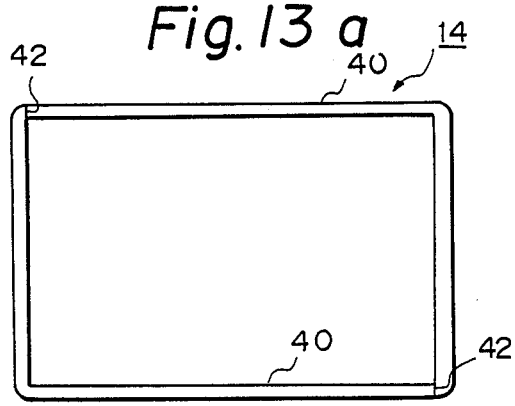
FIGS. 13a and 13b are respectively a plan view of a variation of the same rectangular ring and an enlarged view of a portion thereof.
Figure 13:
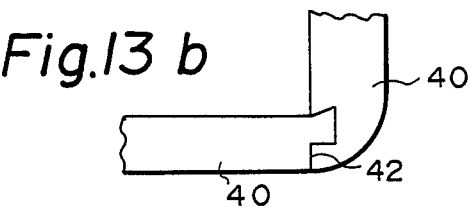

In order to increase the yield, it is possible, as shown in FIGS. 13a and 13b which are a plan view and an enlarged view of a portion of another example of the rectangular ring 14, to combine two L-shaped frames 40, and if necessary connect the joint portions 42 by welding, for example, thereby obtaining a rectangular frame 14. At this time, in order to increase the precision of assembly of the L-shaped frames 40, as shown in the enlarged view of FIG. 13b, the joint portions 42 can be constructed so that they fit into one another.

Next, a method for assembling and connecting a shallow vessel 13 and a rectangular ring 14 will be explained.

Figure 14:
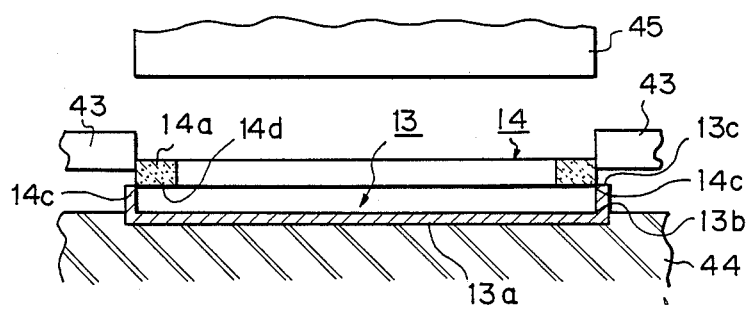
FIGS. 14a and 14b are schematic explanatory views of an assembly process for a shallow vessel and a rectangular ring by the method of the present invention.
Figure 14:
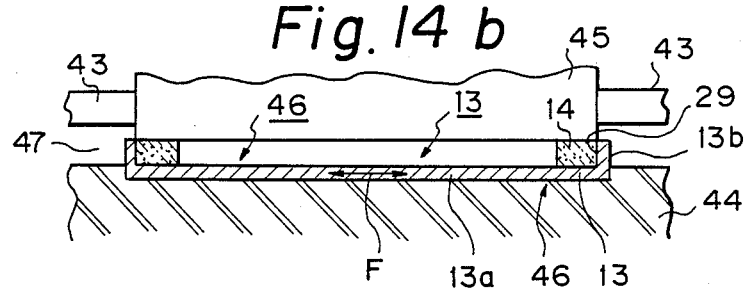

FIGS. 14a, and 14b are schematic diagrams for explaining the steps in one example of an assembly method. FIG. 14a shows the state in which a rectangular ring 14 which is centered with respect to a shallow vessel 13 by a guide 43 is lowered onto the shallow vessel 13 which is positioned by a base 44, and the outer peripheral shoulder 14c of the ring contacts the upper end surface 13c of the side walls of the shallow vessel 13. A pressing member 45 is lowered from above by an unillustrated pressing apparatus, and as shown in FIG. 14b, the rectangular ring 14 is fit inside the inner surface of the side walls 13b of the shallow vessel.

When the rectangular ring 14 is manufactured by punching, a round portion referred to as "shear droop (penetrating)" is formed on one of the surface of each corner of the cut portion. When shear droop is formed in the corners 14c, the fitting operation can be performed particularly smoothly.

As mentioned earlier, by employing a transition fit or an interference fit, there is no play between the side walls 13b of the shallow vessel 13 and the rectangular ring 14, and the types of connection to be described next can be performed easily. Furthermore, by inserting the rectangular ring 14 by force, in-plane tension within the bottom 13a of the shallow vessel is developed in the direction shown by arrow F in FIG. 14b, and during welding, it becomes difficult to destroy the flatness of the bottom 13a. After the rectangular ring 14 is inserted by force in this manner, the pressing member 45 is raised, and the assembled item 46 which is a fit-together item is removed through the gap 47 between the base 44 and the guide 43.

When the adjoining surfaces of the shallow vessel 13 and the rectangular ring 14 are connected by bonding or brazing, prior to the above-described assembly process, it is necessary to dispose an adhesive or a brazing metal between the adjoining surfaces. This process will be described further on.

There is no particular restriction on the connecting method which is employed, and bonding, welding, brazing, and the like can be employed.

Figure 15:
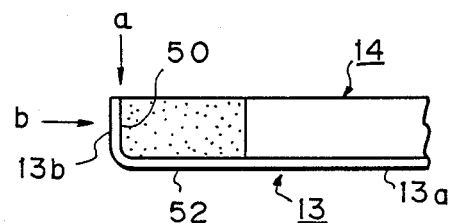
FIGS. 15a and 15b are respectively a cross-sectional view of a portion of a metal case manufactured in accordance with the present invention and a perspective view thereof.
Figure 15:
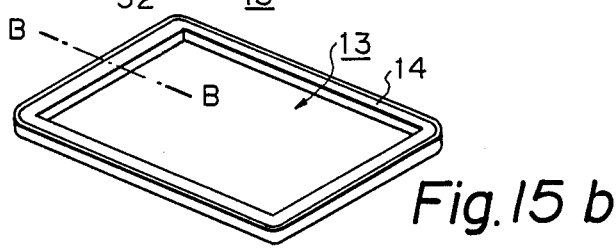

FIG. 15a is a cross-sectional view of the connection between a shallow vessel 13 and a rectangular ring 14 which are assembled as shown in FIG. 15b.

Connection by bonding can be performed using a curable resin or a thermoplastic resin as an adhesive. In the former case, connection can be performed by previously coating the resin on the side wall 50 and the bottom surface 52 of the connecting portions shown in FIG. 15a, and then curing the resin after assembly. In the latter case, connection can be performed by disposing a solid film of a resin between the side wall 50 and the bottom 52 at room temperature, performing heating so as to melt the resin, and then performing cooling so as to cure the resin.

Connection by welding can be performed, for example, by shining a laser from the direction shown by arrow "a" or arrow "b" in FIG. 15a and connecting the side walls 50. Welding does not necessarily need to be performed around the entire periphery, and spot welding can be performed with prescribed intervals between the welds. In this case, it is desirable to seal the side wall 50 and the bottom surface 52 with a resin to prevent the penetration of moisture and the like. Thus, it is desirable to employ resin bonding together with welding.

Brazing can be performed by assembling the shallow vessel 13 and the rectangular ring 14 with foil-shaped brazing metal, for example, disposed against the bottom surface 52, melting the brazing metal by heating in a heating furnace, and then performing cooling. The brazing metal in contact with the bottom surface 52 should flow to the side walls 50 during the melting process, and in cases in which the fluidity of the brazing metal is inadequate, brazing metal can be placed in contact with the side wall 50 as well prior to heating. Alternatively, the side wall can be connected by welding.

Welding is performed along the peripheral rim of the assembled item 46 (see FIG. 14b). The welding of the rim can be performed by welding around the entire periphery or by spot welding in a number of locations. First, welding around the entire periphery will be described.

One method of welding around the entire periphery is laser welding.

When the assembled item 46 is to be subjected to laser welding, as shown in FIG. 16a, it is desirable that the depth "h"' of the shallow vessel 13 be slightly smaller than the thickness $t_c$ of the rectangular ring 14, and that a weld bead 54 be formed on the step 55 (see FIG. 16b).

FIG. 16b is a schematic cross-sectional view of one example of laser welding. A laser beam 56 from a laser gun 57 is shined along the connecting line between the top portion 13c of the side walls of the shallow vessel 13 and the rectangular ring 14. This portion is melted and a weld bed 54 is formed. The laser gun 57 and the assembled item 46 are moved with respect to one another at a constant speed while maintaining a constant positional relationship between the laser gun 57 and the line along which welding is to be performed.

A second method of welding along the entire periphery is seam welding.

Figure 17:
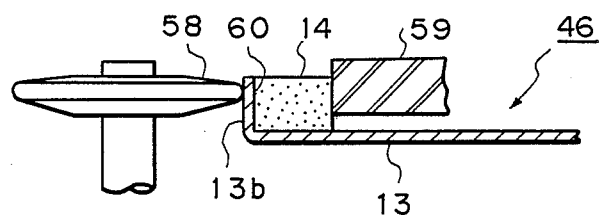
FIG. 17 is a schematic perspective view of welding operations during seam welding.

FIG. 17 is a schematic cross-sectional view of one example of seam welding. A rotating electrode 58 is applied to the outer peripheral surface of the side walls 13b of the shallow vessel while the inside of the rectangular ring 14 is supported by an inner fixed electrode 59. A current is passed through both electrodes, and the interface 60 which is pressed by the rotating electrode 58 is welded. The rotating electrode 58 makes one pass around the outer peripheral surface of the side walls 13b and the entire periphery is welded.

Figure 18:
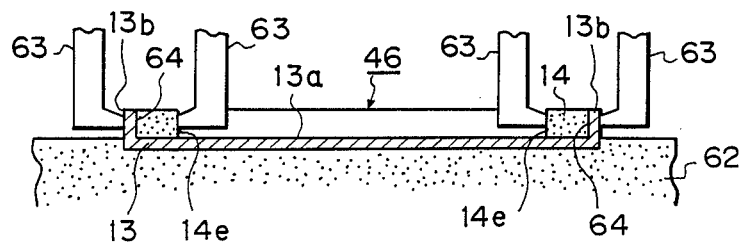
FIGS. 18a, 18b, and 18c are schematic explanatory views of the welding of the peripheral rim by electric spot welding.
Figure 18:
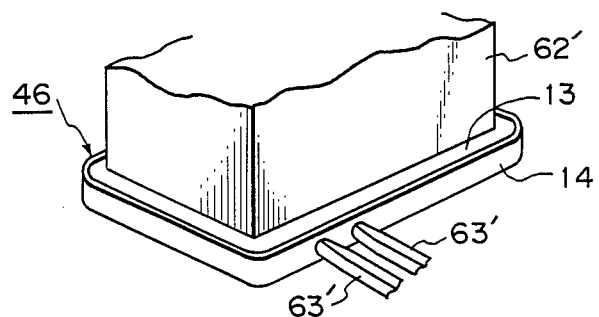
Figure 18:
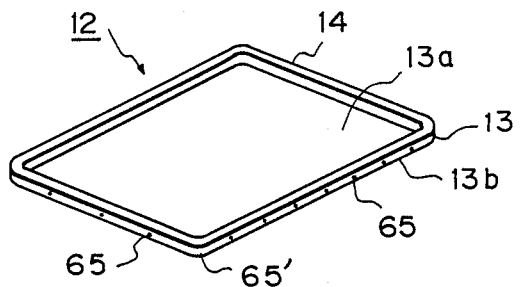

FIG. 18a is a schematic cross-sectional view of one example of spot welding.

An assembled item (fit-together item) 46 is held by a positioning jig 62. A side wall 13b of the vessel and the inner peripheral portion 14e of the rectangular ring 14 are sandwiched between a pair of welding tips 63, current is passed therebetween while pressure is applied, and a nugget is formed on the interface 64. Welding can be performed at one location at a time by employing a single pair of welding tips 63, but if a large number of welding tips is used, as shown in the perspective view of a metal case in FIG. 18c, it is possible to weld all the welding points 65 at one time.

FIG. 18b shows the case 12 in which series welding is performed by two tips 63' from the outer surface of an assembled item 46 which is set in a positioning jig 62' and two points are welded simultaneously. In this case as well, it is possible to weld all the welding points at one time by using a large number of tips. As explained earlier, the side walls 13b of the vessel adhere to the outer peripheral surface of the rigid rectangular ring 14, so spot welding does not produce surge. The welding points 65 become slightly indented, so in cases in which these indentations would be troublesome, if welding points 65' are formed only at the corners as shown in FIG. 18c, they will not be prominent. When performing series welding, two welding points can be formed in the vicinity of the corners.

Figure 16:
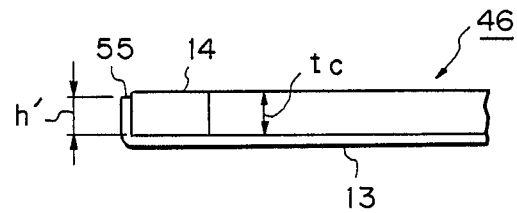
FIGS. 16a and 16b are schematic explanatory views of laser welding operations.
Figure 16:
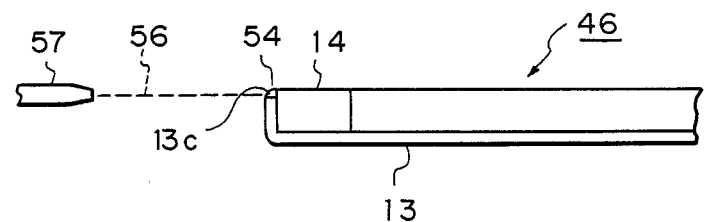

When performing the laser welding of FIG. 16, the laser beam 56 can be intermittently shined while the laser gun 57 and the assembled item 46 are moved relative to one another, thereby performing spot welding. In addition, when performing the seam welding of FIG. 17, projections can be formed on the outermost periphery in the circumferential direction of the rotating electrode 58 at a suitable pitch, and spot welding can be performed by rotating the electrode 58 around the outer periphery of the assembled item 46.

Figure 23:
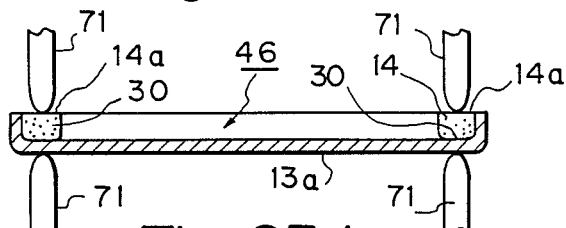
FIGS. 23a and 23b are schematic explanatory views of electric spot welding of a rectangular ring and a shallow vessel from above and below.
Figure 23:
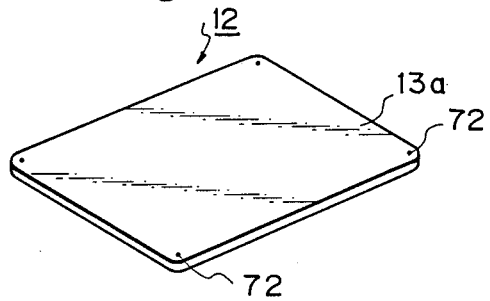

The welding of the peripheral rim of the assembled item 46 has been described, but in some cases, as shown in FIG. 23a, spot welding can be performed by sandwiching the bottom 13a of the shallow vessel and the top surface 14a, of the rectangular ring 14 from above and below between electrodes 71. However, in this case, dents due to spot welding remain, so if welding is performed only in corner spots 72 as shown in FIG. 23b, the external appearance will not be seriously degraded. FIG. 23a is a schematic cross-sectional view showing the formation of a metal case by spot welding of an assembled item 46, and FIG. 23b is a perspective view of the back side of the metal case 12 upon the completion of spot welding.

When only spot welding is performed on the peripheral rim of the bottom surface of an assembled item 46, and when a metal case 12 like that shown in FIG. 6 is used to make an IC card, there is the danger of water or of moisture-containing air penetrating into the space 15 within the case. Moisture has a harmful effect on the electronic parts including IC's which are housed within the space 15, so it is of course absolutely necessary to avoid its penetration.

Methods of sealing the shallow vessel 13 and the rectangular ring 14 include sealing using a resin or rubber having adhesive properties, and sealing by brazing.

Figure 19:
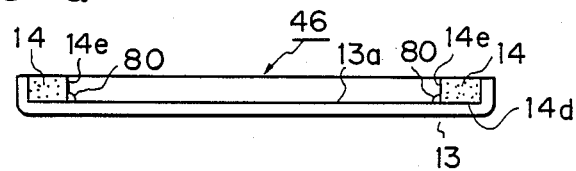
FIGS. 19a, 19b, and 19c are schematic cross-sectional views showing the sealing of the adjoining surfaces of a shallow vessel and a rectangular ring.
Figure 19:
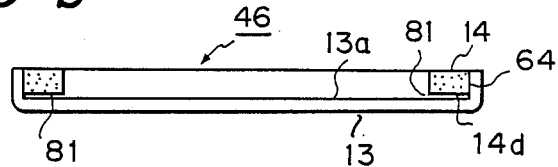
Figure 19:
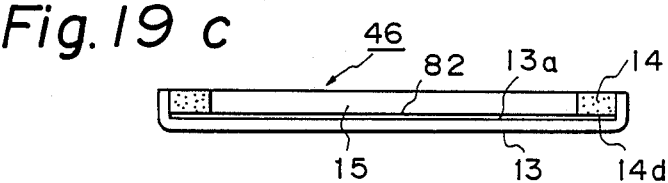

FIG. 19 shows examples of sealed portions. FIG. 19a shows the case in which a sealing material 80 is provided at the joint between the inner periphery 14e of the rectangular ring 14 and the inside of the bottom 13a of the shallow vessel 13. A resin or rubber in the form of a paste or a liquid is used as the sealing material 80, and it is cured by drying or heating.

FIG. 19b shows the case in which a sealing material 81 is disposed between the bottom surface 14d of the rectangular ring 14 and the inside of the bottom 13d of the shallow vessel 13. In this case, as previously stated, in the assembly process of FIG. 14, it is necessary to dispose the sealing material between the bottom surface 14d of the rectangular ring 14 and the inside of the bottom 13a of the shallow vessel 13 in advance. A resin or rubber in the form of a paste is applied to the appropriate portions of one or both of the bottom surface 14d of the rectangular ring 14 and the inside of the bottom 13a of the shallow vessel 13, and curing is performed by drying or heating. Alternatively, sealing can be performed by disposing a resin film or brazing metal foil between the bottom surface 14d of the rectangular ring and the inside of the bottom 13a of the shallow vessel 13, melting by heating with the application of a suitable surface pressure, and then cooling. When the sealing material has excellent fluidity, the sealing material 81 flows around to the interface 64 along the inner walls as shown in FIG. 19b, and the strength of the connection is increased. Of course, it is also possible to perform sealing by previously disposing sealing material in the form of a resin or rubber along the interface 64 with the side walls. When sealing of the interface 64 with the side walls is performed and the strength of the connection is adequate, the above-described welding can be omitted.

When using a resin or rubber as a sealing material, it is possible, as shown in FIG. 19c to cover the entire inner side of the bottom 13a of the shallow vessel 13 with a sealing material 82 to provide electrical insulation, whereby the passage of electricity between the electronic parts housed within the depression 15 and the shallow vessel 13 is prevented.

Figure 24:
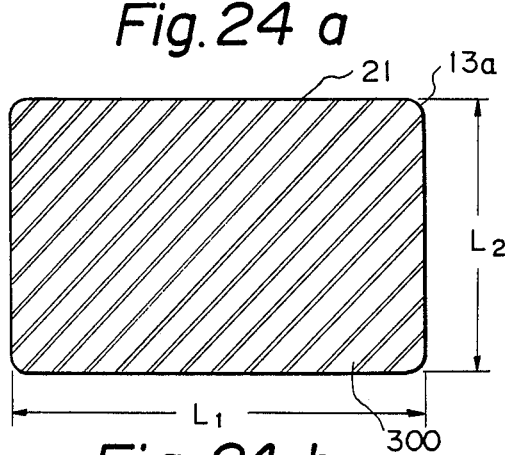
FIGS. 24a and 24b are respectively a plan view and a sectional view of a blank the entire surface of which is covered with a resin layer.
Figure 24:
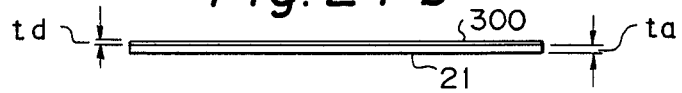

Alternatively, it is possible to form the shallow vessel 13 from a blank 21 which has been pre-coated with a resin. FIGS. 24a, and 24b are respectively a plan view and a side view of such a blank 21. The entire top surface of the blank 21 is coated with a resin layer 300 having a thickness $t_d$.

The resin layer 300 can be formed either by coating a liquid resin on the top surface of a metal sheet or by bonding a solid film to the top surface of a metal sheet.

Figure 25:
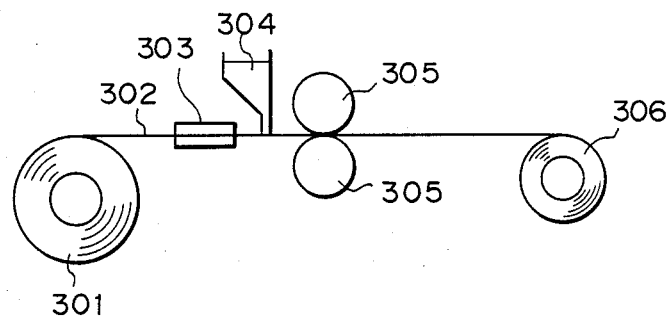
FIGS. 25a and 25b are respectively schematic illustrations of the formation of a resin-coated metal sheet.
Figure 25:
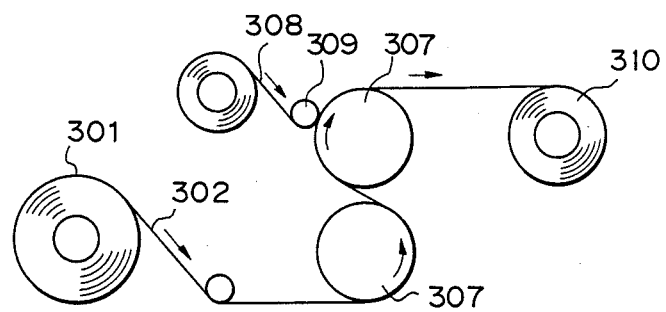

FIG. 25a is a schematic illustration of the formation of a resin layer 300 by the first method. As shown in this figure, a coil 301 of metal sheet 302 having a thickness $t_a$ which is to be formed into a blank 21 is passed through a heater 303 in which it is preheated to a prescribed temperature. A heated resin 304 in fluid form is then applied to the top surface of the metal sheet, after which the metal sheet is passed through a pair of rollers 305 which adjust the thickness of the resin 304 so as to form a uniform resin layer of thickness $t_d$. After the resin has cooled, the metal sheet and the resin coating are wound into a coil 306 around a take-up reel.

FIG. 25b is a schematic illustration of the second method in which a solid film is adhered to the surface of a metal sheet. As shown in this figure, a coil 301 of metal sheet passes around two heating rollers 307 which heat the metal sheet to a prescribed temperature. A coil 308 of a solid resin in the form of a tape is passed over a roller 309 which presses the resin film against the surface of the heated metal sheet. The resin film melts easily and adheres to the top surface of the metal sheet to form a composite sheet as shown in FIG. 24b. After the metal sheet and the resin film have cooled, they are wound into a coil 310 around a take-up reel.

The coil 310 can then be cut into blanks 21 of appropriate size and formed into shallow vessels 13 as shown in FIGS. 10a and 10b by a press in the manner already described.

Figure 26:
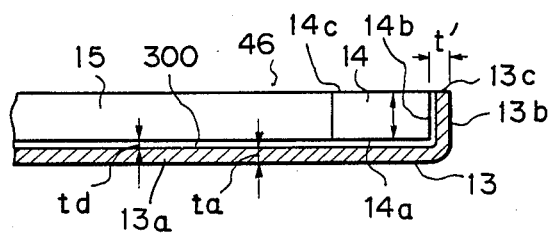
FIG. 26 is a sectional view of an assembled item comprising a shallow vessel and a rectangular ring with a resin layer intervening therebetween.

FIG. 26 shows a sectional view of an assembled item 46, in which the entire inner side of the bottom 13a of the shallow vessel 13 is covered with a resin layer 300. The resin layer 300 is served as electrical insulation as well as an adhesive when heated. In this case, the passage of electricity between the electronic parts housed within the depression 15 and the shallow vessel 13 is successfully prevented.

Figure 27:
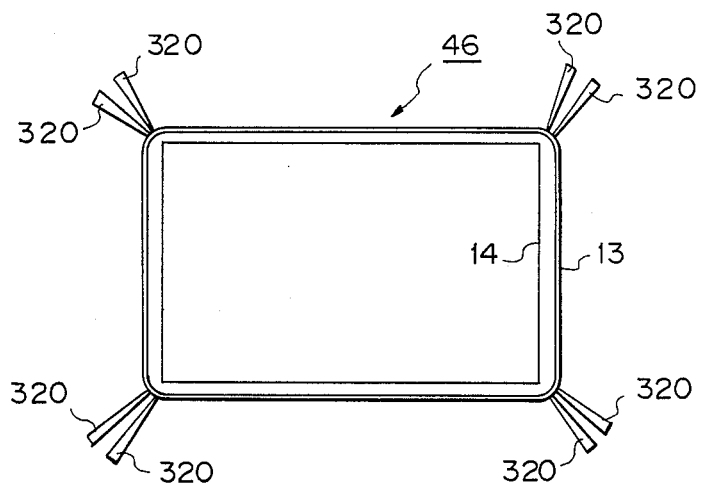
FIGS. 27a, 27b, and 27c are respectively schematic illustrations of series spot welding.
Figure 27:
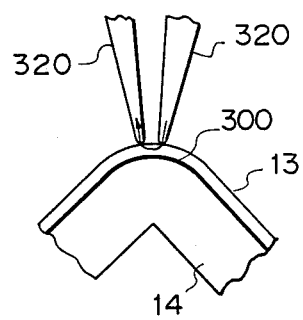
Figure 27:
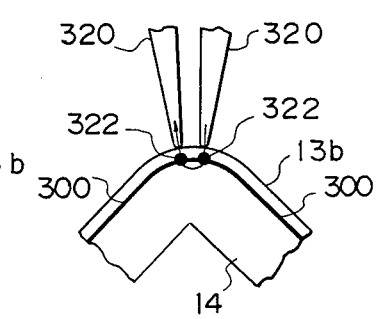

The resin layer is an electrical insulator, and if the resin layer is sufficiently thick, it is not possible to weld the rectangular ring to the shallow vessel by direct spot welding in the manner shown in FIGS. 18a and 23a since current can not flow from the shallow vessel to the rectangular ring through the resin layer. However, as shown in FIG. 27, it is possible to connect the two members by series spot welding. As shown in FIG. 27a, after a rectangular ring 14 is fit inside a shallow vessel 13 to form an assembled item 46, a pair of welding electrodes 320 is pressed against one of the outside corners of the shallow vessel 13. When a voltage is applied between the electrodes 320, since the electrically-insulating resin layer 300 is disposed between the shallow vessel 13 and the rectangular ring 14, current can flow only through the corner portion of the shallow vessel as shown by the arrows in FIG. 27b, which is an enlarged view of one of the corner portions. The current causes the corner portion to heat up, and the heat softens the resin layer 300 in the corner portion. The pressure of the electrodes 320 against the outside of the shallow vessel causes some of the softened portion of the resin layer 300 to flow away so that the resin layer is reduced in thickness. FIG. 27c illustrates the state when the resin layer 300 has become thinner, and in this state, current is able to flow through the rectangular ring 14 as well as the shallow vessel 13, as shown by the arrow in FIG. 27c. The current flowing through both members welds them together, and two nuggets 322 are formed at the interface between the shallow vessel and the rectangular ring.

Although in the figures, welding is performed only in the corner portions, it is also possible to weld the shallow vessel and the rectangular ring to one another along their straight portions in the same method.

In the present invention, there is no particular restriction on the material of which the metal case is made. However, in light of the above-described properties which are required of the case, non-magnetic stainless steel, titanium, titanium alloys, and the like are preferable.

In the above manner, a metal case in accordance with the present invention is characterized by being a combination of a shallow vessel and a rectangular ring. As a connecting surface does not appear on the sides, the case can protect with high reliability and has an excellent external appearance. Furthermore, the shallow vessel and the rectangular ring can be manufactured with high efficiency in large quantities by press working, so the case is advantageous with respect to cost. Furthermore, the shallow vessel and the rectangular ring are assembled by press fitting and are formed into a single body by bonding, brazing, welding, or the like, so the connection therebetween is strong, and the same rigidity can be obtained as with a case formed from a single member by etching or the like.

In addition, according to a manufacturing method of the present invention, a metal case for an IC card is provided which has excellent manufacturing efficiency, which has rigidity and sturdiness which are in no way inferior to those of a conventional one-piece product, and which has an excellent appearance. Accordingly, the present invention is highly significant at the present time in which there are great expectations concerning IC cards.

Next, the present invention will be explained in further detail by means of examples.

EXAMPLE 1

Using SUS 304 stainless steel sheet with a thickness $t_a$ of 0.1 mm, a shallow vessel like that shown in FIGS. 10a and 10b with $l_1$=85.6 mm, $l_2$=54.0 mm, R=3 mm, $t_b$=0.6 mm, and $t'$=0.1 mm was manufactured, and using SUS 304 stainless steel sheet with a thickness "h" of 0.5 mm, a rectangular ring like that shown in FIGS. 12a and 12b with $l_1''$=85.45 mm, $l_2''$=53.85 mm, and $R'$=2.9 mm was manufactured. The two were assembled with a polypropylene film having a thickness of 50 micrometers disposed against the bottom surface 52 of FIG. 15a. While pressure was applied in the direction of thickness, heating was performed to 170° C. followed by cooling to room temperature. Next, the side walls 50 were spot welded in the direction of arrow "b" in FIG. 15a, and a metal case of prescribed dimensions was obtained.

EXAMPLE 2

A shallow vessel and a rectangular ring like those described in Example 1 were manufactured and assembled with a piece of foil of Ag-Cu brazing metal having a thickness of 50 micrometers disposed against the bottom surface 52 of FIG. 15a. Heating to approximately 850° C. was performed in a vacuum furnace followed by cooling, after which the side walls 50 were spot welded in the direction of arrow "b" of FIG. 15a, and a metal case of prescribed dimensions was obtained.

EXAMPLE 3

A shallow vessel and a rectangular ring like those described in Example 1 were manufactured and assembled by press fitting. Next, laser welding in the direction of arrow "a" in FIG. 15a was performed around the entire periphery, and a metal case of prescribed dimensions was obtained.

EXAMPLE 4

As shown in FIG. 6 and FIG. 11, a shallow vessel 13 having outer dimensions of $l_1$=85.60 mm and l=54.00 mm, corner radius R=3 mm, wall thickness $t'$=0.1 mm, and depth h=0.45 mm was formed by press forming from a sheet of SUS 304 with a thickness of 0.10 mm, and a rectangular ring 14 having outer dimensions of $l_1'$=85.42 mm, $l_2'$=53.82 mm, $R'$=2.9 mm, and widths of its sides of $b_1'$=1.9 mm, and $b_2'$=2.9 mm was formed by punching using a sheet of SUS 304 having a thickness of 0.45 mm. The rectangular ring was fit inside the shallow vessel, and spot welding of the side walls of the peripheral rim was performed as shown in FIG. 18c with a pitch of 5 mm. Next, the rectangular ring 14 and the shallow vessel 13 were sealed using a viscoelastic adhesive resin as a sealing material 80 as shown in FIG. 19a, and a metal case was obtained.

EXAMPLE 5

A shallow vessel 13 of the same material and having the same dimensions as that of Example 4 was prepared, and a sealing material 81 in the form of a thermoplastic resin film having a thickness of 0.035 mm was applied to the portion to be connected of the inside of the bottom 13a as shown in FIG. 19b. A rectangular ring 14 having a thickness of 0.5 mm but otherwise having the same dimensions and made of the same material as that of Example 4 was fit into the shallow vessel, after which pressure and heat were applied followed by cooling, and an adhesive resin layer having a thickness of 0.03 mm was formed at the interface between the bottom of the shallow vessel and the rectangular ring. Then, in the same manner as for Example 4, spot welding was performed along the peripheral rim with a pitch of 10 mm and a metal case was obtained.

EXAMPLE 6

A shallow vessel 13 having the same dimensions and made of the same material as that of Example 4 was prepared, and Cu-Mn-Ni-Ag brazing metal foil having a thickness of 0.05 mm was disposed on the portion to be connected of the inside of the bottom 13a as shown in FIG. 19b. A rectangular metal ring 14 having a thickness of 0.42 mm but otherwise having the same dimensions and made of the same material as that of Example 4 was fit into the shallow vessel, after which heating was performed with the application of pressure in a vacuum furnace. After the brazing metal was made to penetrate into the interface between the bottom and side surfaces of the shallow vessel and the rectangular ring, cooling was performed, spot welding of the side walls of the peripheral rim was performed in the same manner as for Example 4 and a metal case was obtained.

EXAMPLE 7

A rectangular ring 14 having the same dimensions and made of the same material as that of Example 4 was fit into a shallow vessel 13 having the same dimensions and made of the same material as that of Example 4. Then as shown in FIG. 16b, continuous laser welding was performed along the periphery with respect to the top surface of the side walls of the shallow vessel and the rectangular ring, and a metal case was obtained by only welding the entire periphery of the peripheral rim.

EXAMPLE 8

A shallow vessel 13 having the same dimensions and made of the same material as that of Example 4 was prepared, and as shown in FIG. 19b, a Sn-Ag brazing metal foil which was coated with a liquid flux was applied to the portion to be connected of the inside of the bottom 13a of the shallow vessel. A rectangular metal ring 14 having a thickness of 0.42 mm but otherwise having the same dimensions and made of the same material as that of Example 4 was then fit into the shallow vessel, after which brazing was performed by the application of pressure and heat. Then, spot welding was performed at a total of four welding spots 65' in the corners of the side walls as shown in FIG. 18c and a metal case was manufactured.

EXAMPLE 9

A shallow vessel 13 having the same dimensions and made of the same material as that of Example 4 was prepared, and a thermosetting resin in the form of a liquid was coated on the entire inside of the bottom 13a of the shallow vessel and on the inner surface of the side walls as shown in FIG. 19c. A rectangular ring 14 having the same dimensions and made of the same material as that of Example 4 was then fit into the shallow vessel, the resin was cured by heating, and a metal case was obtained.

The metal cases which were manufactured in the above-described examples all satisfy the properties which are now required of metal cases for housing IC's, such as bending stiffness, durability, and sturdiness. Furthermore, their manufacturing costs are easily within allowable limits.

We claim:

1. A metal case for housing electronic parts including an IC of the type having a depression and rim which surrounds the depression and has the shape of a picture frame, characterized by comprising a shallow vessel having a wall on its periphery which is formed from metal sheet having the same thickness as the bottom of said depression and a rectangular metal ring which has a contour such that it can fit into the wall of said shallow vessel, said rectangular metal ring being fit into said shallow vessel and connected thereto so as to form a single body.

2. A metal case for housing an IC as claimed in claim 1, characterized in that said rectangular metal ring is press fit inside the wall of said shallow vessel.

3. A metal case for housing an IC as claimed in claim 1, characterized in that said rectangular metal ring and said shallow vessel are connected by bonding, welding, or a combination thereof.

4. A metal case for housing an IC as claimed in claim 1, characterized in that said rectangular metal ring and said shallow vessel are connected by brazing, welding, or a combination thereof.

5. A metal case for housing an IC as claimed in claim 1, characterized in that the inner contour of said rectangular metal ring is the same as the outer contour of said depression.

6. A metal case for housing an IC as claimed in claim 1, characterized in that said metal case is used for an IC card.

7. A metal case for housing an IC as claimed in claim 1, characterized in that said metal case is used for a card-shaped electronic calculator.

8. A manufacturing method for a metal case for housing an IC, the case having a depression for housing an electronic part which includes an IC and having a peripheral rim in the shape of a picture frame which surrounds said depression, characterized by press forming a shallow vessel having a peripheral wall from a metal sheet having a thickness equal to the thickness of the bottom of the depression, forming a rectangular ring which is made from a metal sheet and which has an outer peripheral shape such that it can fit into the inner wall of said shallow vessel and which has roughly the same inner peripheral shape as the outer peripheral shape of said depression and then fitting said rectangular ring against the inner surface of the side wall of said shallow vessel so as to form a fit-together item, and connecting said shallow vessel and said rectangular ring which constitute said fit-together item to form a single body.

9. A manufacturing method as claimed in claim 8, wherein said rectangular ring is manufactured by punching.

10. A manufacturing method as claimed in claim 8, wherein said shallow vessel and said rectangular ring which constitute said fit-together item are connected by bonding or by brazing.

11. A manufacturing method as claimed in claim 8, wherein the side wall of said shallow vessel and the outer peripheral surface of said rectangular ring which constitute said fit-together item are connected by electric spot welding or laser welding.

12. A manufacturing method as claimed in claim 8, wherein said shallow vessel and said rectangular ring which constitute said fit-together item are connected by a combination of bonding and welding.

13. A manufacturing method as claimed in claim 8, wherein said shallow vessel and said rectangular ring which constitute said fit-together item are connected by a combination of brazing and welding.

14. A manufacturing method as claimed in claim 8, wherein said shallow vessel is press formed from a metal sheet which is pre-coated with a resin layer.

15. A manufacturing method as claimed in claim 14, wherein the resin layer is formed by coating a liquid resin on the surface of the metal sheet.

16. A manufacturing method as claimed in claim 14, wherein the resin layer is formed by bonding a solid film on the surface of the metal sheet.

17. A manufacturing method as claimed in claim 14, wherein said shallow vessel and said rectangular ring are connected by spot welding.

* * * * *